United States Patent [19]

Jung et al.

[11] 4,135,041

[45] Jan. 16, 1979

[54] DUST REDUCTION FOR ELECTRODE PLATES

[75] Inventors: Margarete Jung, Kelkheim; Ernst Voss, Liederbach; Tsvetko Chobanov, Frankfurt am Main, all of Fed. Rep. of Germany

[73] Assignee: Varta Batterie Aktiengesellschaft, Fed. Rep. of Germany

[21] Appl. No.: 885,601

[22] Filed: Mar. 13, 1978

[30] Foreign Application Priority Data

May 27, 1977 [DE] Fed. Rep. of Germany ....... 2723947

[51] Int. Cl.² ............................................. H01M 4/56
[52] U.S. Cl. .................................... 429/225; 427/126
[58] Field of Search ................................ 429/225–228; 427/126, 421, 435; 428/450, 457

[56] References Cited

U.S. PATENT DOCUMENTS

| 724,619 | 4/1903 | Schmidt-Predari | 429/225 X |
|---|---|---|---|
| 3,433,674 | 3/1969 | Lello et al. | 429/225 X |
| 3,518,120 | 6/1970 | Lello et al. | 429/225 X |
| 3,716,412 | 2/1973 | Peters | 429/228 X |

*Primary Examiner*—Charles F. LeFevour
*Attorney, Agent, or Firm*—Weiser, Stapler & Spivak

[57] ABSTRACT

Lead dust evolution from battery plates is reduced by applying a coating containing a silicate. Also plates so produced.

8 Claims, No Drawings

DUST REDUCTION FOR ELECTRODE PLATES

The subject of this invention is an electrode plate for lead storage batteries whose surface is provided with a dust fixating coating.

In the storage battery industry various operational steps in the manufacture of electrode plates, particularly after intermediate drying, are accompanied by an undesirable evolution of lead dust. Experience has shown that the major quantity of lead dust is produced from formed positive plates during their subsequent processing steps up until installation in the battery.

In view of the tightened requirements of pollution control and of work place sanitation it is appropriate to eliminate this undesirable condition.

The invention therefore has as its goal to utilize a surface treatment of the electrode plate which can be integrated without difficulty into the production process in order to impede the lead dust formation, or rather to so bind the lead dust that during handling of the electrodes there is at most very little abrasion.

U.S. Pat. No. 3,905,829 discloses a process which contemplates the treatment of freshly pasted electrode plates through brushing on or spraying on of an aqueous solution of water soluble organic polymer compounds, as well as immersion into such a solution. As these water soluble polymers, there are utilized among others polyvinyl alcohol, polyethylene oxide, alkylcellulose and starch. After evaporation of the water they leave on the surface of the plate a thin film which binds the lead dust particles. However, due to the water solubility of the film forming products, their dust binding effect is only temporary, until a subsequent washing treatment again largely removes the coating.

If the applied organic polymer compounds are not subjected during the formation process to thorough oxidation into carbonic acid, then other acids which remain as residues, such as acetic acid, formic acid, citric acid and others are capable of producing corrosion because they form soluble lead salts. If, on the other hand, the treatment for dust fixation is carried out on the positive plates after they have been formed and are therefore particularly subject to dusting, then it is not possible to prevent at least a portion of the water soluble organic substances from being entrained into the battery electrolyte. This can be expected to have adverse effects upon the electrochemical processes during charging or discharging operation. Very frequently the presence of soluble organic substances in the battery electrolyte also manifests itself through foam formation.

Accordingly, it is an object of this invention to provide a dust-free electrode plate which has only slight tendency to dust formation due to surface treatment with a coating producing substance.

It is another object to provide such a plate in which the coating that is formed is chemically largely inert and does not adversely affect the electrical properties of the storage battery.

These and other objects which will appear are achieved by providing a coating which contains a silicate as its film forming component.

Electrode plates according to the invention are preferably positive grid plates which are immersed in either dry or moist condition for a few seconds in dilute solutions of, for example, sodium silicate, $Na_2SiO_3$ (soda water glass) and are then dried for about one hour at 60° C. in an oven in ambient air. If desired the solution may also be applied by spraying. Obviously, positive as well as negative electrode plates may be treated in accordance with the invention, and this may be done after pasting as well as after forming; preferably the treatment takes place after the pasting.

Under the designation "soda water glass" there is commercially available a broad spectrum of sodium silicate solutions. The chemical composition and the physical properties of these materials fall approximately within the following ranges: 22 to 37% $SiO_2$, 6 to 18% $Na_2O$, 28 to 55% solid content, density 1.26 to 1.75 grams per cubic centimeter and viscosity (20° C.) 20 to 2,000 centipoise. For application in accordance with the invention a soda water glass has proven particularly desirable whose analysis shows values which coincide generally with the lower limits of the above mentioned ranges.

Such a water glass is applied to the plates by immersion, either undiluted or diluted with water in the relationship 1:1. The immersion time period is up to one minute, and preferably 10 seconds. Subsequently, it is dried at 60° C. for one to two hours. The dry plate surface thereafter has a glazed appearance.

In factories in which the plates are formed in the block casing, the water glass treatment is preferably performed upon the freshly pasted plates because the mounting process is essentially completed prior to the forming step. In so doing, it has been found that the curing which follows the pasting is in no way adversely affected by the water glass film. Moreover, a reduced tendency to crumbling of the plates is discernible.

To evaluate the dust binding capacity of coatings according to the invention, the plates are subjected either to a vibration test or to an abrasion test. It is found that the dust quantity derived from an impregnated electrode plate is only about 5 to 10% of the dust emission from an untreated electrode plate.

The quantity of water glass which is taken up by the plate depends upon the concentration of the solution. The viscosity of the solution is also of significance because solutions of low viscosity penetrate deeper into the pores, whereas solutions of higher viscosity drain more slowly after removal from the solution. In addition the quantity of water glass which is taken up depends upon the moisture of the plate. For example, it has been determined that a dry plate takes up in one second about 10 grams of a relatively high viscosity undiluted water glass, whereas a moist plate takes up in 10 seconds only 5 grams. For dilute, low viscosity water glass solutions the fixating medium quantities which are taken up by the plate amount to less than 3 grams (dry plate) after a treatment period of one minute, and to less than 1 gram (wet plate) (these values being applicable to electrode plates with dimensions of 149 × 106 × 1.6 mm). This observation is readily explained by the fact that, even during the relatively long treatment period, the water present in the interior of the porous plate cannot be exchanged so rapidly. Nevertheless, the subsequently evolved dust quantities remain approximately equally low, that is, reduced to values of less than 1.4 mg per plate, while the dust emission without fixating medium can go as high as 10 mg per plate.

Since the dust fixation is thus also possible when wet plates are used, there is achieved the advantage that formed plates may be treated immediately after washing without having to previously dry them. This is desirable from the standpoint of energy saving.

The treatment duration has only a minor influence upon the dust binding. The success of the treatment does not vary appreciably for immersion times ranging from 10 seconds to one minute. Therefore, the treatment duration of 10 seconds may be considered as completely adequate.

The effectiveness in accordance with the invention of the dust binding coating is reinforced by the fact that water glasses in acid solutions rapidly condense into polysilicic acid with formation of Si—O—Si links and thereby exhibit a tendency towards network formation.

The electrical behavior of the electrode plate is essentially unaffected by the coating in accordance with the invention. An additional advantage is achieved by mixing the water glass solution with a highly diluted aqueous dispersion of an organic polymer compound. Due to the organic compound the coating formed in this manner is characterized by enhanced elasticity. The organic additives which are all water insoluble may be simple polymers such as polyvinyl acetate, polystyrol, polyacrylate, polyvinyl chloride or co-polymers whose components may consist, for example of styrol and acrylic acid ester, styrol and butadiene, or vinyl acetate and maleic acid ester. They belong to the group of thermoplastic polymerization synthetics and otherwise are used as raw materials for varnishes in the varnish industry. For example, they are available under the commercial name of "Mowilith" from the company Farbwerke Hoechst AG.

For utilization in accordance with the invention the commercially available, about 50% aqueous dispersion of the synthetic polymer is diluted to a 1:10 relationship and this dilute is mixed with the commercially available water glass solution in the ratio 1:1. The treatment liquid then has an overall solid content of 15 to 27% by weight. Application of the water glass solution with the synthetic additive to the electrode plate and its drying is then performed in the same manner as previously described.

There results a coating which reduces in optimal fashion the dust formation to a residue of about 2.5% of the dust emission from an untreated plate.

An overview of treatment results both with pure water glass solutions and with a water glass/Mowilith combination, divided between dry and wet plates, yield the Tables 1 and 2 below. In both cases positive formed plates were utilized and a dust abrasion test was performed.

TABLE 1

| | Dry Plates, 1 minute immersion; 2 hours drying at 60° C. | | | |
|---|---|---|---|---|
| Test No. | Solid Content of Original Water- glass Solution (%) | Dilution | Substance Quantity (g/plate) | Dust Quantity (mg/plate) |
| 1 | untreated | | 0 | 9.70 |
| 2 | 28 | 1:1 | 2.00 | 0.63 |
| 3 | 35 | 1:0 | 2.50 | 0.76 |
| 4 | 38 | 1:1 | 2.90 | 0.46 |
| 5 | 45 | 1:3 | 1.50 | 0.80 |
| 6 | Original Water- glass Solution of Test No. 2 + Mowilith diluted 1:10 | 1:1 | 2.20 | 1.0 |

TABLE 2

| | Wet Plates, 1 minute immersion; 2 hours drying at 60° C. | | | |
|---|---|---|---|---|
| Test No. | Solid Content of Original Water- glass Solution (%) | Dilution | Substance Quantity (g/plate) | Dust Quantity (mg/plate) |
| 7 | 28 | 1:0 | 0.80 | 0.76 |
| 8 | 35 | 1:0 | 0.35 | 0.93 |
| 9 | 38 | 1:1 | 0.56 | 1.00 |
| 10 | 45 | 1:3 | 0.25 | 2.90 |
| 11 | Original Water- glass Solution of Test No. 2 or No. 7 + Mowilith diluted 1:10 | 1:1 | 0.35 | 0.9 |

Of interest is a comparison of Test No. 3 (dry plate) with Test No. 7 (wet plate): in both cases the same degree of protection involving a dust quantity of 0.76 mg per plate is obtained. However, for the wet plate less water glass was utilized in the treatment liquid and the layer forming substance quantity amounted to only barely one-third that for the dry plate.

In addition to the synthetic materials named, sugar and sodium sulfate have also proven to be suitable additives to the soda water glass. They play the role of pore formers, because they are subsequently dissolved out of the insoluble silicic acid coating by the electrolyte and thereby prevent excessive coverage of the electrochemically active surface. In addition to these additives, however, water glass remains the principal ingredient of the dust binding layer and therefore the real film forming material.

A 30% sugar solution, mixed with undiluted water glass solution in the ratio 1:1, was capable of reducing the dust quantity to 1% of an untreated plate, the immersion time however being 8 minutes.

When the soda water glass solution was diluted in the ratio 1:1 with 15% $Na_2SO_4$ solution there was obtained after a 10 second immersion and drying only half as great a dust quantity as with the same dilution but without $Na_2SO_4$.

We claim:
1. A lead electrode plate for lead storage batteries whose surface is provided with a dust fixating coating wherein
   the coating includes sodium silicate as a film forming component.
2. The electrode plate of claim 1 wherein
   the coating contains in addition to the sodium silicate a small quantity of a thermoplastic synthetic.
3. The electrode plate of claim 2 wherein
   the thermoplastic synthetic material is a co-polymer of acrylic acid ester and styrol.
4. The electrode plate of claim 2 wherein
   the thermoplastic synthetic material is a co-polymer of butadiene and styrol.
5. The electrode plate of claim 1 wherein
   the coating additionally contains a pore forming substance.
6. The electrode plate of claim 5 wherein
   the pore forming substance is sugar.
7. The electrode plate of claim 5 wherein
   the pore forming substance is sodium sulfate.
8. A lead electrode plate for lead storage batteries whose surface is provided with a dust fixating coating wherein
   the coating includes water glass as a film-forming component.

* * * * *